(12) United States Patent
Baid et al.

(10) Patent No.: US 10,007,695 B1
(45) Date of Patent: Jun. 26, 2018

(54) REPLICATION LAG-CONSTRAINED DELETION OF DATA IN A LARGE-SCALE DISTRIBUTED DATA STORAGE SYSTEM

(71) Applicant: Dropbox, Inc., San Francisco, CA (US)

(72) Inventors: Mehant Baid, San Mateo, CA (US); Bogdan Munteanu, San Mateo, CA (US); Daniel K. Tahara, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days. days.

(21) Appl. No.: 15/601,094

(22) Filed: May 22, 2017

(51) Int. Cl.
*G06F 17/30* (2006.01)

(52) U.S. Cl.
CPC .. *G06F 17/30371* (2013.01); *G06F 17/30283* (2013.01)

(58) Field of Classification Search
CPC ......... G06F 17/30575; G06F 17/30377; G06F 17/30371; G06F 17/30581; G06F 17/30312; G06F 17/30595; G06F 17/30079; G06F 17/30088; G06F 17/30345; G06F 17/30592; G06F 17/30091; G06F 17/30212; G06F 17/30289; G06F 17/30309; G06F 17/30008; G06F 17/30215; G06F 17/303; G06F 17/30578
See application file for complete search history.

(56) References Cited

U.S. PATENT DOCUMENTS

| 7,323,970 | B1* | 1/2008 | Murray | B60R 25/04 340/426.12 |
|---|---|---|---|---|
| 2007/0050523 | A1* | 3/2007 | Emeott | H04W 56/001 709/248 |
| 2007/0061379 | A1* | 3/2007 | Wong | G06F 17/30575 707/999.201 |
| 2009/0292706 | A1* | 11/2009 | Ishimoto | G06F 17/30362 707/999.008 |
| 2009/0313311 | A1* | 12/2009 | Hoffmann | G06F 11/2094 707/999.204 |
| 2010/0191884 | A1* | 7/2010 | Holenstein | G06F 11/2094 707/613 |
| 2011/0264704 | A1* | 10/2011 | Mehra | G06F 17/30578 707/802 |
| 2013/0227028 | A1* | 8/2013 | Thiel | G06F 17/30575 709/206 |
| 2014/0040206 | A1* | 2/2014 | Ramakrishnan | G06F 11/2097 707/640 |

(Continued)

*Primary Examiner* — Ashish K Thomas
*Assistant Examiner* — Rezwanul Mahmood
(74) *Attorney, Agent, or Firm* — Hickman Palermo Becker Bingham LLP

(57) ABSTRACT

Computer-implemented techniques for replication-lag constrained deletion of data in a distributed data storage system. In some aspects, the techniques improve the operation of a computing system by preventing too high of a delete rate that causes severe replication lag while at the same time increasing and decreasing the delete rate over time to a maximum allowable delete rate constrained by measured replication lag in terms of both local replication lag and geographic replication lag. In one implementation, the delete rate is adjusted by increasing or decreasing a pause interval that determines how long a database data deletion process pauses between submitting database deletion commands to a database server.

22 Claims, 8 Drawing Sheets

(56) References Cited

U.S. PATENT DOCUMENTS

| | | | |
|---|---|---|---|
| 2014/0188801 A1* | 7/2014 | Ramakrishnan | G06F 17/30575 707/634 |
| 2014/0201145 A1* | 7/2014 | Dorman | G06F 17/30174 707/634 |
| 2014/0229544 A1* | 8/2014 | Evans | G06Q 50/01 709/204 |
| 2014/0244584 A1* | 8/2014 | Song | G06F 17/30345 707/627 |
| 2014/0258223 A1* | 9/2014 | Cao Minh | G06F 17/30575 707/610 |
| 2014/0297588 A1* | 10/2014 | Babashetty | G06F 11/1458 707/613 |
| 2015/0242481 A1* | 8/2015 | Hasegawa | G06F 17/30117 707/623 |
| 2016/0140132 A1* | 5/2016 | Lin | G06F 17/30339 707/637 |
| 2017/0111695 A1* | 4/2017 | Barton | H04N 21/4583 |
| 2017/0116298 A1* | 4/2017 | Ravipati | G06F 17/30368 |

* cited by examiner

REPLICATION LAG-CONSTRAINED DELETION OF DATA IN A LARGE-SCALE DISTRIBUTED DATA STORAGE SYSTEM

TECHNICAL FIELD

The present invention relates to distributed data storage systems. More particularly, the present invention relates to replication lag-constrained deletion of data in a large-scale distributed data storage system.

BACKGROUND

Today, many online services, including many Internet services used by users around the globe, are implemented as complex, large-scale distributed computing systems. These online services are often constructed from collections of software applications developed by different software development teams, often in different software programming languages. The collection of software applications may span hundreds or thousands of computing machines, across multiple data center facilities.

Because of this complexity, the architecture of an online service is typically structured in "tiers" with each tier composed of many computing machines. The tiers are conceptually stacked on top of one another from the perspective of processing network requests received over a data communications network (e.g., the Internet) from end-user devices and generating network responses to the network requests that are sent back over the data communications network to the end-user devices.

One of the tiers is typically composed of a large-scale distributed data storage system for persisting and retrieving data used by applications in an "application tier" of the online service. The application tier conceptually sits on top of the data storage system tier and may implement much of the end-user facing functionality of the online service. The "application" data used by the applications may include, for example, information provided by end-users, metadata about such information or any other information used by the applications as a part of providing the online service to end-users.

DETAILED DESCRIPTION OF EMBODIMENTS

Figure 1:
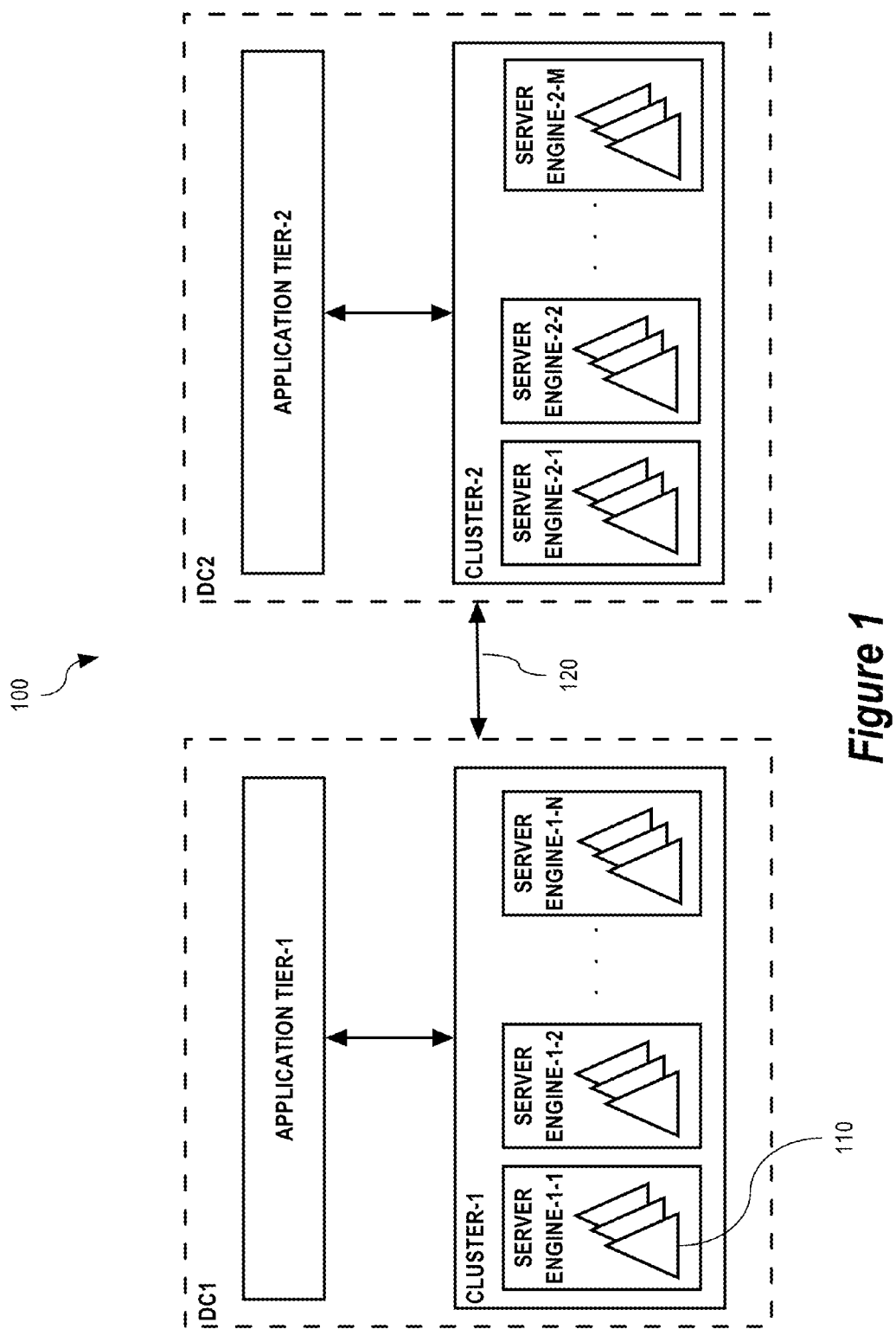
FIG. 1 shows a large-scale distributed data storage system, per an embodiment of the present invention.

An online service provider may need to delete data from a large-scale distributed data storage system. Deleting data may be needed for various reasons. A common reason is to free up data storage space for new data. For example, data stored for users that no longer use the online service may be deleted to make room for new user data.

One challenge that may be faced by the online service provider when deleting data is that there may be a large amount of data to delete. For example, the distributed data storage system may store many petabytes of data or more. Thus, deleting even a fraction of the total amount of stored data can still involve deleting a substantial amount of data (e.g., many terabytes or more).

Given the large amount of data that may be targeted for deletion, there may be a tendency to attempt to delete all the targeted data in a single database transaction to delete the data as quickly as possible and thereby free up storage space as quickly as possible. For example, a single database transaction may be submitted to each database server of the storage system which may process the operation on its respective database. However, because of the large amount of data targeted by the transaction, this approach can quickly consume substantial computing resources of the database servers possibly even to the point of detrimental impact on the processing of requests from the application tier. The impact may be noticeable to end-users of the online service by the service's lack of usual responsiveness.

Another possible approach may be to delete portions of the targeted data in separate transactions. In this case, the separate transactions may be submitted to each database server on a regular predefined time interval. However, if a predefined time interval is selected that is too small, then the above-mentioned problems associated with a single large transaction may be encountered. On the other hand, if a predefined time interval is selected that is too large, it may take too long to the delete all the targeted data.

Overview of Replication-Lag Constrained Deletion of Data

To address the foregoing problems and other problems with possible approaches for deleting data in a large-scale distributed data storage system, techniques described, suggested, and implied herein include systems and methods for replication lag-constrained deletion of data in a large-scale distributed data storage system. The techniques may be used in place of or in conjunction with the existing approaches for deleting data in a large-scale distributed data storage system.

The techniques account for a recognition that deleting a large-amount of data from a database in a distributed data storage system too quickly can cause a replication sub-system of the distributed data storage system to suffer substantial performance degradation or even fail. The replication sub-system may be used to replicate data stored in "master" databases of the distributed data storage system to "slave" databases of the distributed data storage system. If the delete rate is too high, the replication sub-system may suffer substantial performance degradation or even fail because of the processing load the delete rate places on disk and network I/O and CPU resources used by the replication sub-system when processing the replication events generated as consequence of deleting the data.

In an embodiment of the present invention, the rate at which data is deleted from a database is constrained by measured replication lag. Generally, replication lag refers to the time delay between when data is stored in a master database and when the data replicated by the replication sub-system is stored in a slave database. Some replication lag is expected. However, a large replication lag can be indicative of a replication sub-system that is under stress and might be about to fail.

In an embodiment, the techniques include a method for replication-lag constrained deletion of data in a distributed data storage system. The method is performed by a "data vacuum" computing system comprising one or more processors and memory. The method includes the data vacuum serially and periodically submitting commands to a database server of the distributed data storage system. The commands are to delete data from a corresponding database. After each submission of a command, the data vacuum pauses (sleeps) for a time before submitting the next command. The length of the time that the data vacuum pauses between submissions of commands is referred to herein as the "pause interval."

In an embodiment, the pause interval has an initial default value and is automatically adjusted by the data vacuum thereafter based on measured replication lag. The data vacuum may periodically shorten the pause interval starting from the initial default value by a decrement amount while both a local slave database replication lag metric is below a local slave replication lag threshold and a geo-slave database replication lag metric is below a geo-slave replication lag threshold. The local slave database replication lag metric may be based on a single measurement or periodic measurements of the replication lag between a master database server and a slave database server that are co-located in the same data center. The geo-slave database replication lag metric may be based on a single measurement or periodic measurements of the replication lag between a master database server and a slave database server that are in different, geographically distributed data centers.

In an embodiment, while a local slave database replication lag metric is above the local slave replication lag threshold and/or a geo-slave database replication lag metric is above the geo-slave replication lag threshold, the data vacuum may periodically lengthen the pause interval starting from the then current value by an increment amount. The data vacuum can return to periodically shortening the pause interval after both a local slave database replication lag metric and a local slave replication lag metric and are again below their respective thresholds. The data vacuum may continue this process of periodically shortening and lengthening the pause interval based on local and geo slave replication lag metrics thereby maintaining a delete rate constrained by the local and geo slave replication lag thresholds.

The techniques disclosed herein for replication lag-constrained deletion of data in a distributed data storage system improve a computing system comprising one or more processors and memory for deleting data in the distributed data storage system. The improvement results from preventing too high of a delete rate that causes severe replication lag while at the same time adjusting the delete rate over time to a maximum allowable delete rate constrained by measured replication lag in terms of both local replication lag and geographic replication lag.

Terminology

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements may not be limited by these terms, depending on context. These terms may be used only to distinguish one element from another, depending on context. For example, a first database server may be termed a second database server, and, similarly, a second database server may be termed a first database server, without departing from the scope of the various described embodiments. The first database server and the second database server may both be database servers, but may not be the same database server.

The terminology used in the description of the various described embodiments herein is for describing embodiments only and is not intended to be limiting. As used in the description of the various described embodiment and the appended claims, the singular forms "a," "an," and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "metric" refers to any of: the value of a single measurement or a value computed therefrom, or the values of a set of measurements taken over time or a value or a set of values computed therefrom. For example, the value of a single measurement of the replication lag between two servers is a metric. As another example, the average, mean, weighted average, or weighted mean of the values of periodic measurements of the replication lag between the two servers taken over time is also a metric.

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "severe replication lag" can be understood to mean a replication lag metric that is above a threshold.

Large-Scale Distributed Data Storage System Environment

While the present invention may be implemented using a single computing machine, the present invention is preferably implemented using multiple computing machines in a distributed computing environment. FIG. 1 shows an example of a distributed computing environment 100, per an embodiment of the present invention.

Environment 100 includes two data centers labeled DC1 and DC2. Each data center DC1 and DC2 may include a facility or building for co-locating computing systems and associated components such as data network communications equipment, data storage equipment, and cooling equipment. Data centers DC1 and DC2 may be located at a geographic distance from one another. The geographic distance may be many miles. For example, data center DC1 may be in San Francisco, Calif., U.S.A. and data center DC2 may be in New York, N.Y. U.S.A. It is also possible for data centers DC1 and DC2 to be in different countries. In general, however, the geographic distance between data centers DC1 and DC2 may be at least a few miles.

While in an embodiment the distributed computing environment includes only two data centers, the distributed computing environment may include more than two data centers in another embodiment. In this case, the distributed computing environment may be viewed as being composed of pairs of data centers (data center peers) of which the environment 100 depicted in FIG. 1 is representative of each such pair (peers).

As shown in FIG. 1, each data center DC1 and DC2 may include an application tier, labeled Application Tier-1 and Application Tier-2 in FIG. 1, respectively. Each application tier may be composed of multiple computing machines that execute processes that operate as network clients of a respective distributed data storage system cluster. As shown in FIG. 1, a distributed data storage system cluster labeled Cluster-1 serves client processes in Application Tier-1 and a distributed data storage system cluster labeled Cluster-2 serves client processes in Application Tier-2. Each distributed data storage system cluster is also composed of multiple computing machines that execute respective database server engines. The computing machines of Cluster-1 execute database server engines Server Engine 1-1, Server Engine 1-2, . . . Server Engine 1-N and the computing machines of Cluster-2 execute Server Engine 2-1, Server Engine 2-2, . . . Server Engine 2-M. The distributed data storage system clusters Cluster-1 and Cluster-2 may have the same or a different number of server engines. Details of an example database server engine are described below with respect to FIG. 2.

While in an embodiment different computing machines are used to execute the client processes of the application tier and the server engines of the distributed data storage system cluster, the same computing machine may execute one or more of the client processes and one or more of the server engines in another embodiment.

Various computing machines of the application tier and the distributed data storage system cluster in a data center may be interconnected by one or more data communications networks. Such a data communications network may support various network communications protocols for sending and receiving network messages (e.g., network requests and network responses thereto) between the various computing machines. Non-limiting examples of network communications protocol suitable for implementing an embodiment of the present invention include the Hyper Text Transfer Protocol (HTTP), the Secure Hyper Text Transfer Protocol (HTTPS), and/or other Internet Protocol (IP)-based network communications protocol.

In an embodiment, data stored in a distributed data storage system cluster is sharded (horizontally partitioned) over the server engines of the distributed data storage system cluster. As used herein, a shard 110 refers to a horizontal partition of a database. Each of the server engines may store multiple of the shards. In a non-limiting exemplary embodiment, a distributed data storage system cluster contains approximately two thousand (2,000) shards distributed across approximately two hundred and fifty (250) server engines.

Per an embodiment, in operation, a client process that executes in an application tier may connect to and request data from any of the server engines of the distributed data storage system cluster in the data center. The server engine receiving the request from the client process may inspect the request to determine which shard stores the data that the request pertains to. If the server engine receiving the request does not store the target shard, the server engine may redirect the request to one of the other server engines in the cluster that does store the target shard. In an embodiment, the distributed data storage system cluster may include a cache (not shown in FIG. 1) to improve performance of processing read requests from the application tier. The cache may be partitioned and replicated for high-availability. Data in the cache may be invalidated by write requests from the application tier. The invalidation can be strongly consistent or eventually consistent if stale reads are tolerated.

The two data centers DC1 and DC2 may be interconnected by one or more data communications networks 120. As in the case with a data communications networks interconnecting computing machines within a data center, the one or more data communications networks 120 interconnecting data centers DC1 and DC2 may support various network communications protocols (e.g., HTTP, HTTPS, or other IP-based protocol) for sending and receiving network messages (e.g., network requests and network responses thereto) between the data centers DC1 and DC2.

Database Server Engine

Figure 2:
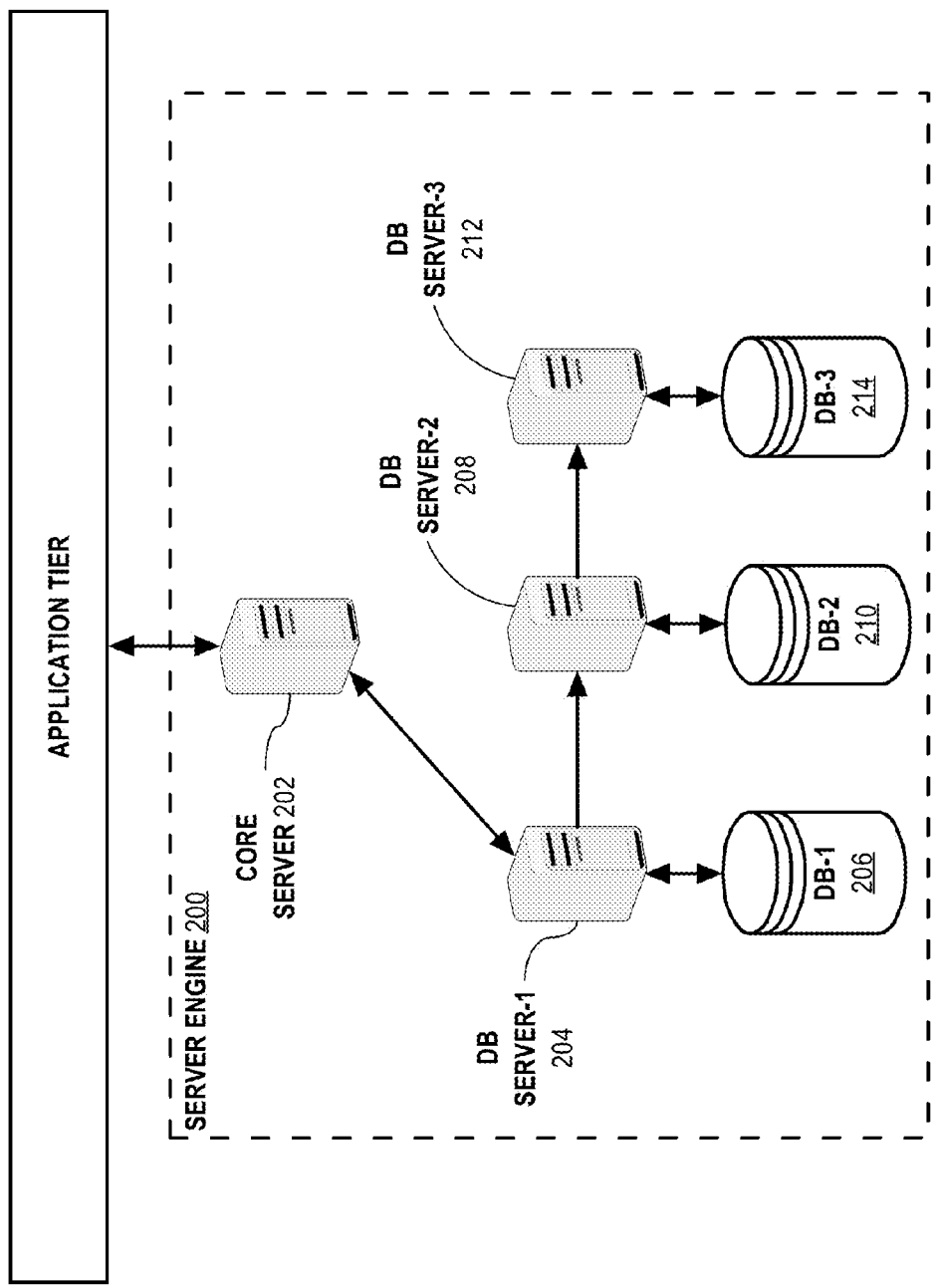
FIG. 2 shows a database server engine of a distributed data storage system cluster, per an embodiment of the present invention.

FIG. 2 shows an example database server engine 200 of a distributed data storage system cluster, per an embodiment. The server engine 200 includes a core server 202, a first database server 204 that operates on a first database 206, a second database server 208 that operates on a second database 210, and a third database server 212 that operates on a third database 214.

The core server 202 receives "client" requests from and sends responses thereto to client processes in an application tier. The core server 202 may redirect some client requests to other server engines in the distributed data storage system cluster if the client requests do not pertain to data stored in the database shards of the database server engine 200. For client requests that do pertain to data stored in the database shards of the database server engine 200, the core server 202 may send corresponding "database" requests to the first database server 204. In some scenarios where the first database server 204 is unavailable or for load balancing purposes, the core server 202 may send database requests to the second database server 208 or the third database server 212.

In an embodiment, the first database 206, the second database 210, and the third database 214 are each a relational database. The first database server 204, the second database server 208, and the third database server 212 may each be capable of processing database requests that are based on the Structured Query Language (SQL) or the like. In an embodiment, core server 202 may perform object-to-relational mapping operations when translating client requests from the application tier to database requests sent to the database servers 204, 208, and 212 and when translating responses to the database requests received from the database servers 204, 208, and 212 to responses to the client requests sent back to the client processes in the application tier.

While in an embodiment the databases 206, 210, and 214 are relational databases, the databases 206, 210, and 214 are logically structured per a different database data model in another embodiment. For example, databases 206, 210, and 214 may be logically structured per a hierarchical, network, object, document, graph, key-value, or another logical database data model. Similarly, while in an embodiment the database servers 204, 208, and 212 are capable of processing database requests that are formulated per SQL or like query language, the database servers 204, 208, and 212 are configured to process database requests that are structured per a different query language in another embodiment. In general, virtually any database query language that supports commands for creating, reading, updating, and deleting data in the databases 206, 210, and 214 may be used.

Database servers 204, 208, and 212 may be configured to replicate data between the databases 206, 210, and 214 in a master-slave configuration. For example, data stored in first database 206 may be replicated to second database 210 and data stored in second database 210 may be replicated to third database 214. In this example, database 206 is a "master" database with respect to "slave" database 210 and database 210 is a "master" database with respect to "slave" database 214. Thus, database data changes applied to first database 206 may first be replicated to second database 210 and then from second database 210 to third database 214.

While in an embodiment such as shown in FIG. 2 a database server engine comprises three database servers and three databases, a database server engine comprises just two database servers and two databases in another embodiment. For example, database sever engine 200 may comprises just database servers 204 and 208 and respective databases 206 and 210 arranged in a master-slave replication configuration.

While in an embodiment such as shown in FIG. 2 a database server engine comprises a core server for translating client requests from client processes in the application tier to database requests sent to the database servers 204, 208, and 212, a database sever engine does not include a core server. In this case, the client processes in the application tier may send database request directly to the database servers 204, 208, and 212.

Local Replication

Figure 3:
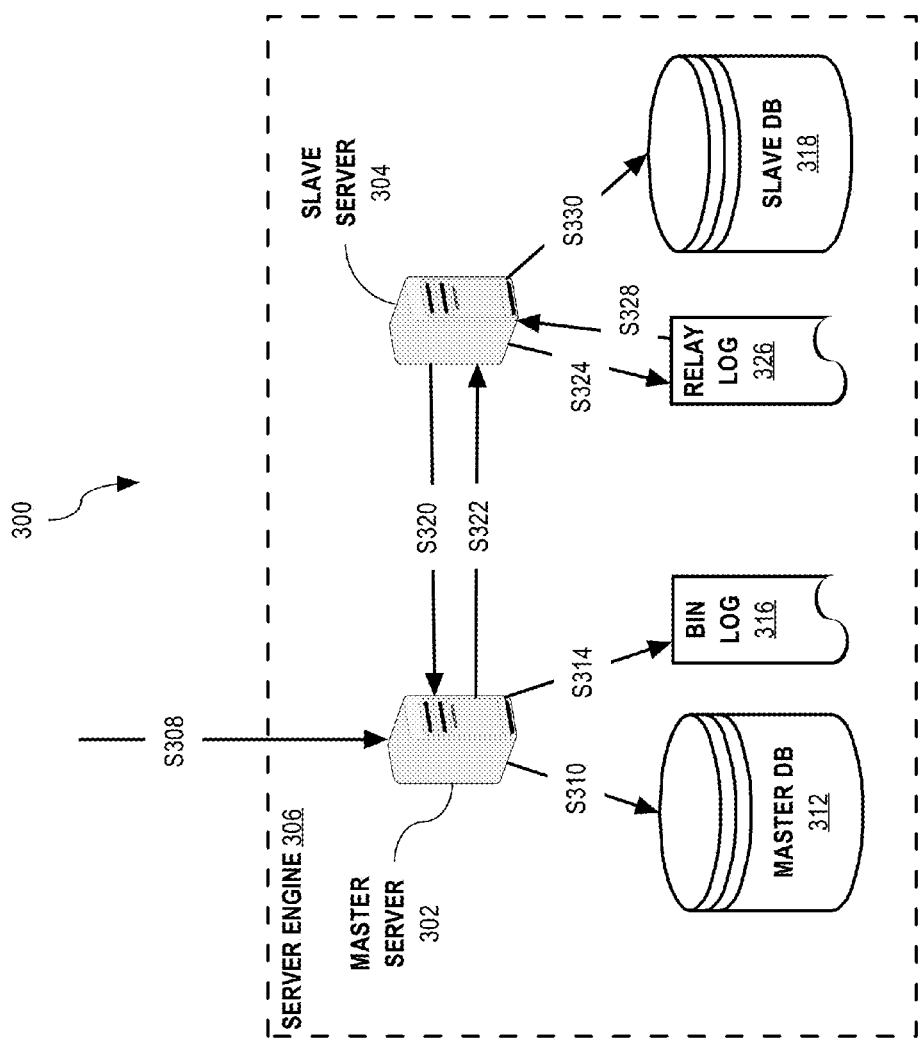
FIG. 3 shows a local replication process, per an embodiment of the present invention.

FIG. 3 shows a local replication process 300, per an embodiment of the present invention. The process 300 involves a master database server 302 and a slave database server 304 of the same database sever engine 306. Master database server 302 receives (S308) create, update, and delete commands from client processes in an application tier and delete commands from a data vacuum computing system as described in greater detail below. The create, update, and delete commands may be formulated per the Structure Query Language (SQL) or the like. For example, the create, update, and delete commands may be SQL INSERT, UPDATE, and DELETE commands respectively. The database commands may be received via a data communications network per a network communications protocol or via other suitable inter-process communications mechanism (e.g., named pipes, shared memory, etc.).

As used herein, unless otherwise apparent in context, the term "master" refers to a database server or a database that is designated as the "master" of certain data stored in the database (which may be a subset of all data stored in the database) and participates in a master-slave replication scheme whereby changes to the database data in the database are propagated to one or more "slave" database servers and/or one or more slave databases that also participate in the replication scheme. A database server and a database can be considered a master of all the data in the database or less than all data in the database. In the less than all case, the database server and the database may be both a master database server and database with the respect to the data they master and a slave database server and database with respect to other data in the database.

The master database 302 executes (S310) the received database commands against the master database 312. In addition, the master database 302 records (logs) (S314) replication events corresponding to the executed database commands in binary log 316. Each replication event recorded in the binary log 316 may be recorded in a statement-based logging format or a row-based logging format. The statement-based logging is used to propagate database commands (e.g., SQL statements) from the master database server 302 to the slave database server 304 where they are executed by the slave database server 304 against the slave database 318. Row-based logging is used to record changes in individual database data objects (e.g., individual database table rows).

The master database server 302 may write (log) replication events to the binary log 316 persisted in non-volatile memory in a sequential fashion through a volatile memory buffer. Thus, while the binary log 316 may be persisted in non-volatile memory, the replication events 316 stored in the volatile memory buffer may be stored in the binary log 316.

The slave database server 304 may request (S320) replication events from the master database server 302 via a data communications network per a network communications protocol or via another inter-process communications mechanism. The master database server 304 may send (S322) replication events in the binary log 316 to the slave database server 304 via a data communications network per a network communications protocol or via another inter-process communications mechanism. As an alternative, the slave database server 304 may read replication events directly from the binary log 316.

The master database server 302 may be able to provide new replication events to the slave database server 304 from the volatile memory buffer without having to read the replication events from non-volatile storage. However, if the slave database server 304 is behind the master database server 302 with respect to replication events stored in the binary log 316, then the master database server 302 may need to read replication events from non-volatile storage to bring the slave database server 304 up-to-date. Thereafter, the master database server 302 may be able to provide new replication events to the slave database server from the volatile memory buffer of the binary log 316.

Replication events that the slave database server 304 obtains may be recorded (logged) (S324) in a relay log 326. Ordinarily, if the slave database server 304 is not substantially behind the master database server 302 with respect to replication events stored in the binary log 316, the latest replication events stored in the relay log 326 are only a one, two, few, or a small number of replication events behind the latest replication events stored in the binary log 316.

The slave database server 304 may read (S328) replication events from the relay log 324 in a first in first out order and apply (S320) them in that order to the slave database 318. The slave database server 304 applies each replication event per whether the replication event is statement-based or row-based. In this way, the local replication process 300 replicates data from master database 312 to slave database 318.

Various factors can contribute to replication lag in the local replication process 300 including time spent by the master database server 302 and the slave database server 304 performing operations that are generally performed serially with respect to a given replication event including the master database server 302 writing (S314) the replication event to the binary log 316 and sending (S322) the replication event to the slave database server 304 and the slave database server 304 writing (S324) the replication event to the relay log 326, reading (S328) the replication event from the relay log 326, and applying (S330) the replication event to the slave database 318.

The components of the server engine 306 may be implemented on a computing system comprising one or more processors and memory. The one or more processors and memory of the computing system may be provided by one or more computing machines. Although components are shown separately in FIG. 3, various components may be implemented on different computing machines or the same computing machine. For example, master server 302, master database 312, and binary log 316 may be implemented on a first computing machine and slave server 304, slave database 318, and relay log 216 may be implemented on a second different computing machine. Alternatively, all the components may be implemented on one computing machine.

Geographic Replication

Figure 4:
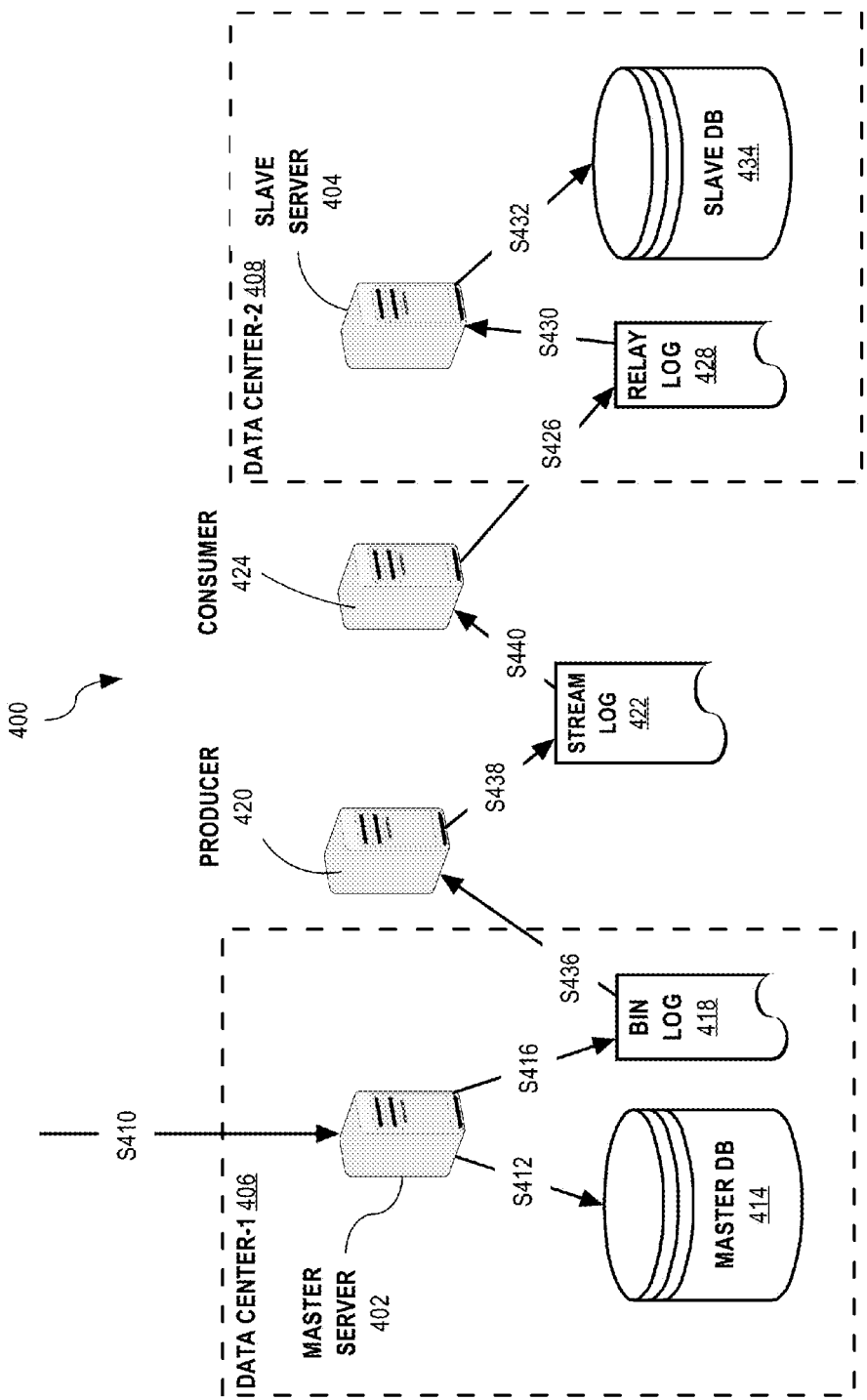
FIG. 4 shows a geographic replication process, per an embodiment of the present invention.

FIG. 4 shows a geographic replication process 400, per an embodiment of the present invention. The geographical replication process 400 uses an event stream processor to move replication events between data centers. A shown, a first data center 406 houses a master database server 402, a master database 414, and a binary log 418. A second geographically distant data center 408 houses a slave database server 404, a slave database 434, and a relay log 428. Replication of database events stored in binary log 418 to the relay log 418 is facilitated by an event stream processor. The event stream processor may include an event producer 420, an event stream log 422, and an event consumer 424. While the components of the event stream processor are not shown in FIG. 4 as residing in any data center, some or all the components may reside in data center 406 and/or data center 408.

Steps S410, S414, and S416 of the geographic replication process 400 may be like Steps S308, S310, and S314 of the local replication process 300, respectively. However, for the geographical replication process 400, the event producer 420 may read or otherwise obtain (S436) replication events from the binary log 418 in a first in first out order and store them or otherwise (S438) cause the replication events to be stored in the event stream log 422 in that order. Event stream log 422 is implemented as an append-only distributed commit log in an embodiment. The event consumer 424 reads or otherwise obtains the replication events (S440) from the event stream log in a first in first out order and stores the replication events in the relay log 428 in that order. The slave database server 404 may then read (S430) the replication events from the relay log 428 and apply them (S432) to the slave database 434 in first in first out order. In this way, replication events may be "streamed" from the master database 414 to the slave database 434 via an event stream processor.

Various factors can contribute to replication lag in the geographic replication process 400 including time spent by the master database server 402, the event producer 420, the event consumer 424, and the slave database server 404 performing operations that are generally performed serially with respect to a given replication event. The operations that may contribute to geographic replication lag may include the master database server 402 writing or otherwise causing (S416) the replication event to be stored in the binary log 418, the event producer reading or otherwise obtaining (S436) the replication event from the binary log 418 and writing or otherwise causing (S438) the replication event to be stored in the event stream log 422, the event consumer reading or otherwise obtaining (S440) the replication event from the event stream log 422 and writing or otherwise causing (S426) the replication event to be stored in the relay log 428, and the slave database server 404 reading or otherwise obtaining (S430) the replication event from the relay log 326, and applying (S434) the replication event to the slave database 434.

The various components depicted in FIG. 4 may be implemented on a computing system comprising one or more processors and memory. The one or more processors and memory of the computing system may be provided by computing machines. Although components are shown separately in FIG. 4, various components may be implemented on different computing machines or the same computing machine. For example, master server 402, master database 414, binary log 418, and event producer 420 may be implemented on a first computing machine in data center 406 and slave server 404, slave database 434, relay log 428, and event consumer 424 may be implemented on a second different computing machine in data center 408.

Process for Replication Lag-Constrained Deletion of Data

Figure 5:
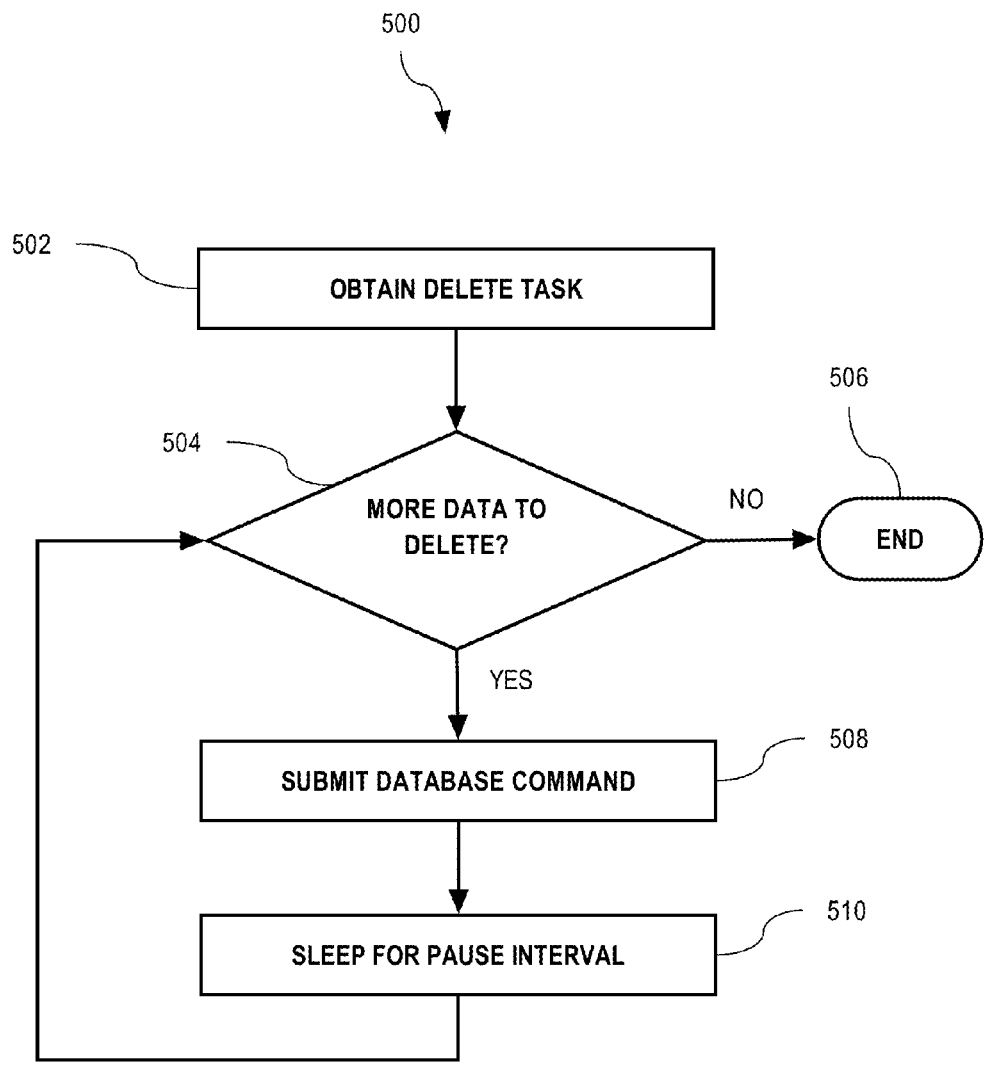
FIG. 5 shows a process for replication lag-constrained deletion of data, per an embodiment of the present invention.

FIG. 5 shows a process 500 for replication-lag constrained deletion of data in a distributed data storage system, per an embodiment of the present invention. The process 500 may be implemented by a computing system comprising one or more processors and memory. The one or more processors and memory of the computing system may be provided by one or more computing machines. For purposes of providing clear examples, the process 500 is described below as being performed by a "data vacuum" computing system.

At operation S502, the data vacuum obtains a delete task to perform. The data vacuum may obtain the delete task via a command line interface, a graphical user interface, and/or a configuration file interface, per an embodiment. The delete task targets data objects stored in a database of a distributed data storage system that is a master database for the data objects. The delete task may target many data objects. For example, the delete task may target tens of thousands of database table rows or more.

To delete the target data objects, the data vacuum serially submits a series of database commands to the master database server of the master database for the data objects. After the submission of each command (S508), the data vacuum sleeps (S510) for a pause interval. Sleeping may accomplished by invoking a system call or a standard library call that pauses execution of the data vacuum process, or a thread thereof, for a length of time (e.g., the pause interval) where the length of time is specified as a parameter to the call.

Figure 6:
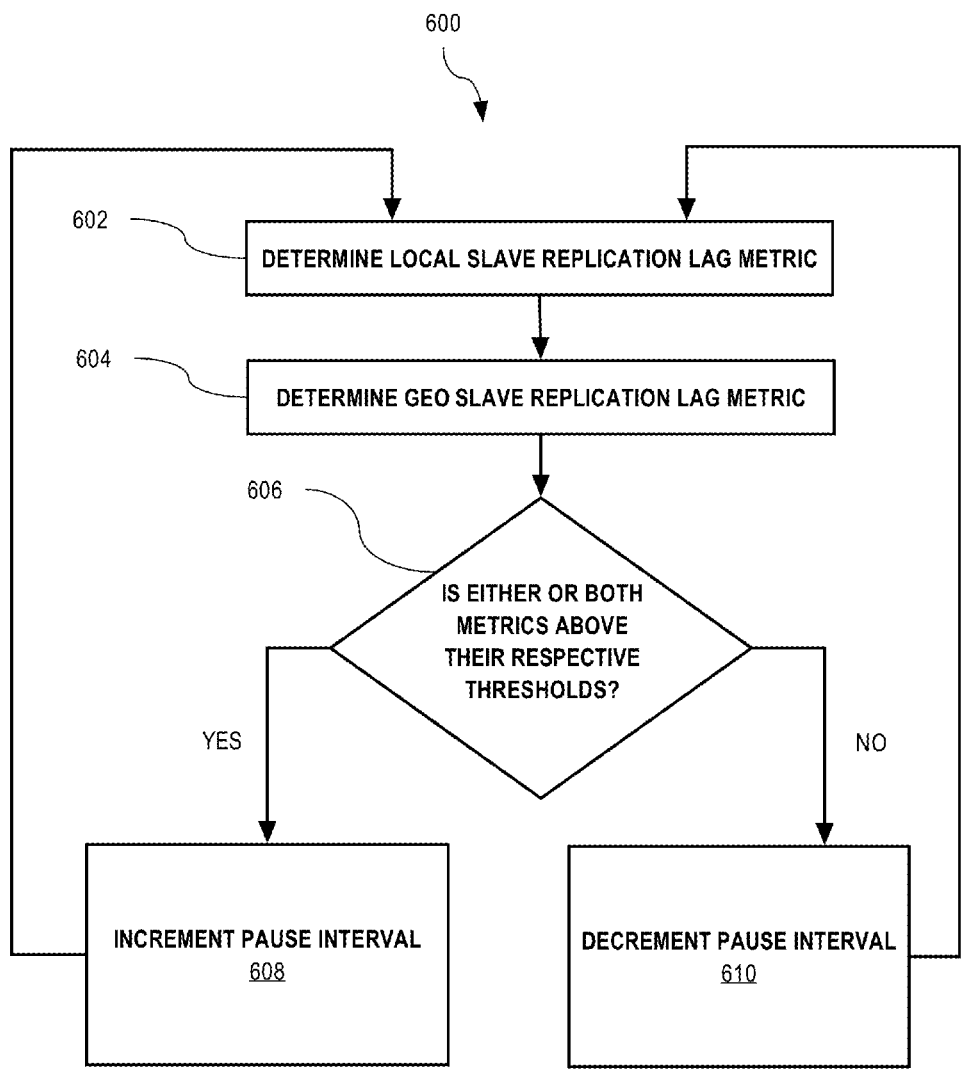
FIG. 6 shows a process for adjusting a pause interval based on measured replication lag, per an embodiment of the present invention.

The pause interval may be periodically adjusted by the data vacuum as described below with respect to FIG. 6. After submitting a database command (S508) and sleeping (S510), if there are still more target data objects to delete (S504), then the process 500 continues with submission (S508) of another database command. Otherwise, if all the target data objects have been deleted, then the process 500 ends (S506).

In an embodiment, each database command is a Structure Query Language (SQL) DELETE command that specifies a maximum number of data objects to delete by the database command. The maximum number of data objects to delete may be specified by the SQL LIMIT clause, in an embodiment. In an embodiment, the maximum number of data objects to delete ranges between 1,000 to 10,000. The master database server may execute the command in the context of a database transaction.

The data vacuum can perform process 500 in parallel against multiple master database servers if the data objects targeted by the delete task are mastered by more than one database in the distributed data storage system. In this case, the database commands may be submitted serially against each of the respective master database servers.

Adjusting the Pause Interval

Initially, the pause interval may start a default value for a given delete task. Thereafter, the pause interval may be adjusted by the data vacuum during execution of the delete task based on measured replication lag. FIG. 6 shows a process 600 for adjusting the pause interval based on measured replication lag, per an embodiment of the present invention.

Process 600 may be performed by the data vacuum for each master database server operating on a database that master's data objects targeted for deletion by the delete task. If there are multiple such master database servers, the process 600 may be performed concurrently for each such master database server.

At operation S602, the data vacuum determines a local slave replication lag metric. The metric may be determined based on a single local slave replication lag measurement or multiple local slave replication lag measurements. If multiple local slave replication lag measurements are used to determine the local slave replication lag metric, then the metric may be computed as an average, mean, weighted average, or weighted mean of the multiple measurements. In an embodiment, a local slave replication lag measurement is a time-based value such as seconds or millisecond representing the local replication lag.

Various techniques may be employed by the data vacuum to measure the local replication lag. In one embodiment, a "heartbeat" technique is used. Per the heartbeat technique, a database object (e.g., a database table row of a database table) is periodically insert or updated (e.g., every few seconds) in the master database by the data vacuum with a current timestamp reflecting a current system clock time at the time of the update. After the insert or update to the data object is replicated to the local slave database, the timestamp is read from the slave database and compared with a then current system clock time. The time difference between the timestamp of the database object and the current system clock time when the timestamp is read from the local save database may be used as a measurement of the local replication lag.

At operation S604, the data vacuum determines a geographic replication lag metric. The metric may be determined based on a single geographic slave replication lag measurement or multiple geographic slave replication lag measurements. If multiple geographic slave replication lag measurements are used to determine the local slave replication lag metric, then the metric may be computed as an average, mean, weighted average, or weighted mean of the multiple measurements. In an embodiment, a geographic slave replication lag measurement is a time-based value such as seconds or millisecond representing the geographic replication lag.

Various techniques may be employed by the data vacuum to measure the geographic replication lag including the heartbeat technique described above. However, to measure the geographic replication lag, the timestamp is read from the geographic slave database in another data center. The time difference between the timestamp of the database object and a current system clock time when the timestamp is read from the geographic slave database may be used as a measurement of the geographic replication lag. If the time difference is computed at the geographic slave database, the time difference value may be sent to the geographic master database over a data network.

At operation S606, the local slave replication lag metric is compared against a local slave replication lag threshold and the geographic slave replication lag metric is compared against a geographic replication lag threshold. In a non-limiting embodiment, the local slave replication lag threshold ranges between one-half millisecond to a few milliseconds and the geographic replication lag threshold ranges between 500 milliseconds and a few seconds. If, based on the comparisons, either or both metrics is above their respective thresholds, then at operation S608, the data vacuum increases the pause interval by a predetermined increment amount. In an embodiment, the predetermined increment amount is equal to the maximum of the local slave replication lag metric and the geographic slave replication lag metric. On the other hand, if both metrics are below their respective thresholds, then at operation S610, the data vacuum decreases the pause interval by a predetermined decrement amount. In an embodiment, the predetermined decrement amount ranges between the minimum of the local slave replication lag metric and the geographic slave replication lag metric.

The data vacuum may periodically perform process 600 to adjust the pause interval such that the delete rate of data from the master database when executed the delete task is constrained by the local and geographic replication lag. By doing so, the data vacuum avoids overwhelming the distributed data storage system, including the replication subsystem, with delete commands.

While in an embodiment the data vacuum can sleep for a pause interval after the submission of each delete command in step S510 irrespective of whether the local slave replication lag metric or the geographical slave replication lag metric is currently above its respective threshold, the data vacuum sleeps for a pause interval only while either the local slave replication lag metric or the geographic slave replication lag metric is currently above its respective threshold in another embodiment. In this other embodiment, the data vacuum may not sleep for any length of time after submission of delete commands so long as and while both the local slave replication lag metric and the geographical slave replication lag metric remain below their respective thresholds. Once one or both the metrics is above a threshold, then the data vacuum may sleep for a pause interval after submission of delete commands. By doing so, the data vacuum may delete data from the distributed data storage system at a faster delete rate compared to a configuration where the data vacuum pauses for some time after submission of delete commands even when both the local slave and geographical slave replication lag metrics are below their respective thresholds.

Basic Implementing Mechanisms

Figure 7:
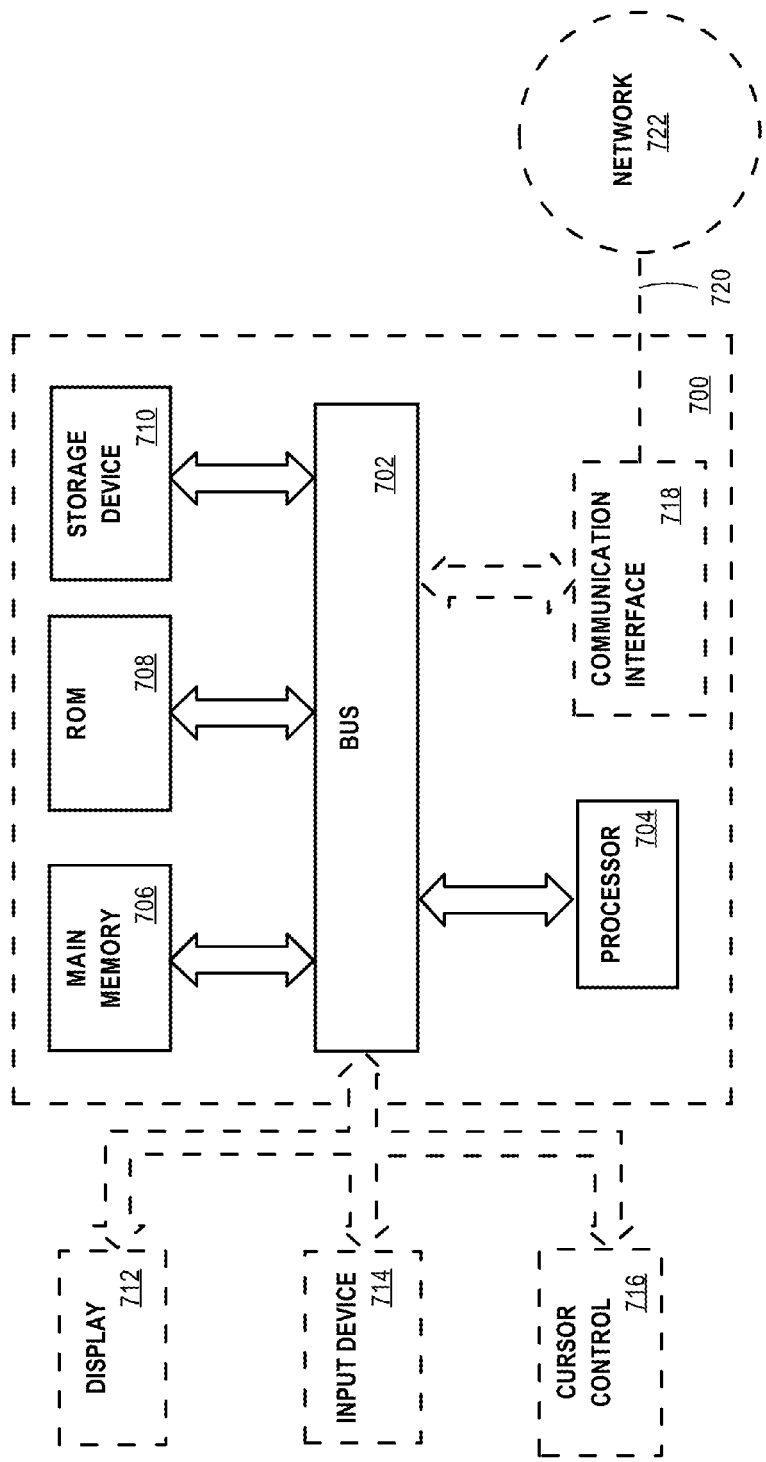
FIG. 7 illustrates a basic hardware machine that may be used utilized to implement the present invention, in an embodiment.

The present invention may be implemented using a computing system comprising one or more processors and memory. The one or more processors and memory may be provided by one or more hardware machines. FIG. 7 illustrates an example of a basic hardware machine 700 that may be used to implement the present invention, per an embodiment of the present invention. Hardware machine 700 and its hardware components, including their connections, relationships, and functions, is meant to be exemplary only, and not meant to limit implementations of the present invention. Other hardware machines suitable for implementing the present invention may have different components, including components with different connections, relationships, and functions.

Hardware machine 700 includes a bus 702 or other communication mechanism for addressing a main memory 706 and for transferring data between and among the various components of hardware machine 700.

Hardware machine 700 also includes a processor 704 coupled with bus 702 for processing information. Processor 704 may be a general-purpose microprocessor, a system on a chip (SoC), or another hardware processor.

Main memory 706, such as a random-access memory (RAM) or other dynamic storage device, is coupled to bus 702 for storing information and software instructions to be executed by processor 704. Main memory 706 also may be used for storing temporary variables or other intermediate information during execution of software instructions to be executed by processor 704.

Software instructions, when stored in storage media accessible to processor 704, render hardware machine 700 into a special-purpose computing machine that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a machine to perform specific operations, and including, but not limited to, application software, desktop applications, scripts, binaries, operating systems, device drivers, boot loaders, shells, utilities, system software, JAVASCRIPT, web pages, web applications, mobile applications, plugins, embedded software, microcode, compilers, debuggers, interpreters, virtual machines, linkers, and text editors.

Hardware machine 700 includes a read-only memory (ROM) 708 or other static storage device coupled to bus 702 for storing static information and software instructions for a processor 704.

A mass storage device 710 is coupled to bus 702 for persistently storing information and software instructions on fixed or removable media, such as magnetic, optical, solid-state, magnetic-optical, flash memory, or any other available mass storage technology. The mass storage may be shared on a network, or it may be dedicated mass storage. Mass storage device 710 may store a body of program and data for directing operation of hardware machine 700, including an operating system, user application programs, driver, and other support files, as well as other data files of all sorts.

Hardware machine 700 may be coupled via bus 702 to a display 712, such as a liquid crystal display (LCD) or other electronic visual display, for displaying information to a computer user. A touch sensitive surface incorporating touch detection technology (e.g., resistive, capacitive, etc.) may be incorporated with display 712 to form a touch sensitive display for communicating touch gesture (e.g., finger or stylus) input to processor 704.

An input device 714 may be coupled to bus 702 for communicating information and command selections to processor 704. Input device 714 may include alphanumeric and other keys. Input device 714 may include one or more physical buttons or switches such as, for example, a power (on/off) button, a "home" button, volume control buttons, or the like.

A cursor control 716, such as a mouse, a trackball, touchpad, touch-sensitive surface, or cursor direction keys for communicating direction information and command selections to processor 704 and for controlling cursor movement on display 712, may be coupled to bus 702. Cursor control 716 may have two degrees of freedom in two axes, a first axis (e.g., x) and a second axis (e.g., y), that allows the device to specify positions in a plane. Cursor control 716 may have more degrees of freedom with a third axis (e.g., z). For example, cursor control 716 may have three translational degrees of freedom (e.g., surge, heave, and sway) in three perpendicular axes, that allows the device to specify position in the three axes. Cursor control 716 may have three rotational degrees of freedom (e.g., pitch, yaw, roll) about three perpendicular axes, that allows the device to specify an orientation about the three axes.

While one or more of display 712, input device 714, and cursor control 716 may be external components (i.e., peripheral devices) of hardware machine 700, some or all of display 712, input device 714, and cursor control 716 may be integrated as part of the form factor of hardware machine 700.

A function or operation of the present invention may be performed by hardware machine 700 in response to processor 704 executing one or more programs of software instructions contained in main memory 706. Such software instructions may be read into main memory 706 from another storage medium, such as a storage device 710. Execution of the software instructions contained in main memory 706 cause processor 704 to perform the function or operation.

While a function or operation of the present invention may be implemented entirely with software instructions, hard-wired or programmable circuitry of hardware machine 700 (e.g., an ASIC, a FPGA, or the like) may be used in place of or in combination with software instructions to perform the function or operation.

The term "storage media" as used herein refers to any non-transitory media that store data and/or software instructions that cause a hardware machine to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more software instructions to processor 704 for execution. For example, the software instructions may initially be carried on a magnetic disk or solid-state drive of a remote computer. The remote computer can load the software instructions into its dynamic memory and send the software instructions over a data communications network. Hardware machine 700 can receive the data over the data communications network and appropriate circuitry can place the data on bus 702. Bus 702 carries the data to main memory 706, from which processor 704 retrieves and executes the software instructions. The software instructions received by main memory 706 may optionally be stored on storage device 710 either before or after execution by processor 704.

Hardware machine 700 may include a communication interface 718 coupled to bus 702. Communication interface 718 provides a two-way data communication coupling to a wired or wireless network link 720 that connects hardware machine 700 to a data communications network 722 (e.g., a local area network (LAN), a wide area network (WAN), a wireless local area network (WLAN), a metropolitan area network (MAN), a storage area network (SAN), etc.). Network link 720 provides data communication through network 722 to one or more other networked devices.

Communication interface 718 may send and receive electrical, electromagnetic, or optical signals that carry digital data streams representing various types of information. For example, communication interface 718 may be implemented by a wired network interface card, a wireless network interface card with an integrated radio antenna, or a modem.

Network link 720 may provide a connection through network 722 to a host computer or to data equipment operated by an Internet Service Provider (ISP). The ISP may in turn provide data communication services through the world-wide packet data communication network now commonly referred to as the "Internet". Network 722 and Internet use electrical, electromagnetic or optical signals that carry digital data streams. The signals through the various networks and the signals on network link 720 and through communication interface 718, which carry the digital data to and from hardware machine 700, are example forms of transmission media.

Hardware machine 700 can send messages and receive data, including program code, through network 722, network link 720, and communication interface 718. In the Internet example, a server might transmit a requested code for an application program through Internet, ISP, and network 722 and communication interface 718.

The received code may be executed by processor 704 as it is received, and/or stored in storage device 710, or other non-volatile storage for later execution.

Figure 8:
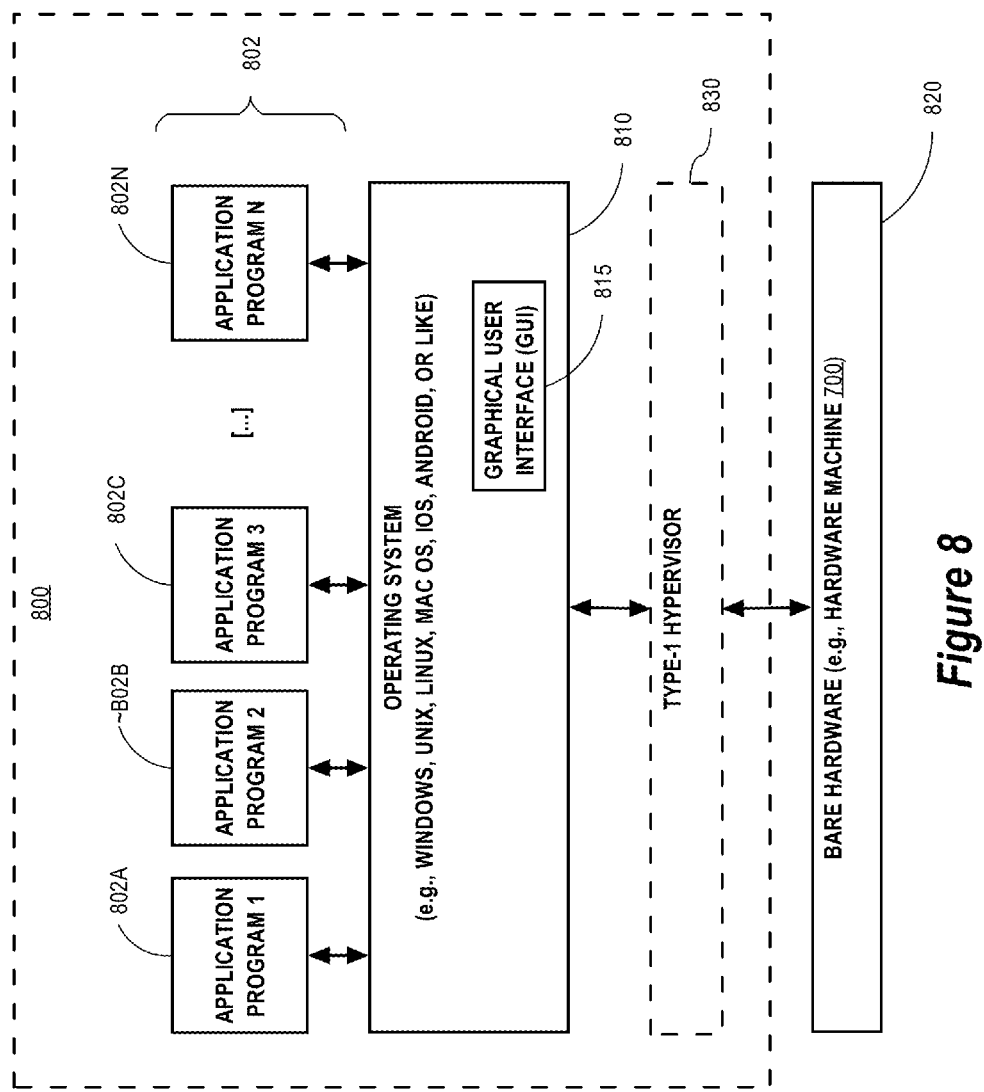
FIG. 8 illustrates a non-limiting example of a basic software system for controlling the operation of the basic hardware machine, in an embodiment.

FIG. 8 illustrates basic software system 800 that may be employed for controlling the operation of hardware machine 700 of FIG. 7, per an embodiment of the present invention. Software system 800 and its software components, including their connections, relationships, and functions, is meant to be exemplary only, and not meant to limit implementations of the present invention. Other software systems suitable for implementing the present invention may have different components, including components with different connections, relationships, and functions.

Software system 800 is provided for directing the operation of hardware machine 700. Software system 800 may be stored in system memory (RAM) 706 and on fixed storage (e.g., hard disk or flash memory) 710.

Software system 800 includes a kernel or operating system (OS) 810. OS 810 manages low-level aspects of computer operation, including managing execution of processes, memory allocation, file input and output (I/O), and device I/O.

Software system 800 includes one or more application programs, represented as 802A, 802B, 802C . . . 802N, that may be "loaded" (e.g., transferred from fixed storage 710 into memory 706) for execution by hardware machine 700. The applications or other software intended for use on hardware machine 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. GUI 815 also serves to display the results of operation from the OS 810 and applications 802, whereupon the user may supply additional inputs or terminate the session (e.g., log off).

Software system 800 can execute directly on bare hardware 820 (e.g., machine 700). Alternatively, a "Type-1" hypervisor 830 may be interposed between the bare hardware 820 and OS 810 as part of software system 800. Hypervisor 830 acts as a software "cushion" or virtualization layer between the OS 810 and bare hardware 820. Hypervisor 830 instantiates and runs one or more virtual machine instances. Each virtual machine instance comprises a "guest" operating system, such as OS 810, and one or more applications, such as applications 802, designed to execute on the guest operating system. Hypervisor 830 presents the guest operating systems with a virtual operating platform and manages the execution of the guest operating systems.

Hypervisor 830 may allow a guest operating system to run as if it is running on bare hardware 820 directly. In this case, the guest operating system as configured to execute on bare hardware 820 can also execute on hypervisor 830. In other words, hypervisor 830 may provide full hardware virtualization to the guest operating system. Alternatively, hypervisor 830 may provide para-virtualization to the guest operating system. In this case, the guest operating system is "aware" that it executes on hypervisor 830 and is specially designed or configured to execute on hypervisor 830.

Extensions and Alternatives

Although some of various drawings may illustrate logical stages in order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

The invention claimed is:

1. A system for causing replication lag-constrained deletion of data in a distributed data storage system, the system comprising:
one or more processors;
a memory; and
one or more computer programs stored in the memory for execution by the one or more processors, the one or more computer programs comprising instructions configured to cause the system to perform operations comprising:
serially submitting a first plurality of commands to a database server to cause the database server to delete data from a first database;
determining a geographic slave database replication lag metric, wherein determining the geographic slave database replication lag metric is based on a data value that reflects a measured time of a replication process to replicate database data from the first database to a second database that is in a different location than the first database;
determining a local slave database replication lag metric, wherein determining the local slave database replication lag metric is based on a data value that reflects a measured time of a replication process to replicate database data from the first database to a third database that is in a same location as the first database;
based at least in part on determining that both: (a) the geographic slave database replication lag metric is above a geographic slave database replication lag threshold and (b) the local slave database replication lag metric is above a local slave database replication lag threshold, adjusting a pause interval associated with the first plurality of commands;
by serially submitting a second plurality of commands to the database server, causing the database server to delete data from the first database at a delete rate that is different than a delete rate at which data is deleted from the first database by the serially submitting the first plurality of commands; and
wherein the serially submitting the second plurality of commands is based on sleeping for the adjusted pause interval after a submission of a command of the second plurality of commands.

2. The system of claim 1, wherein the geographic slave database replication lag metric is a first geographic slave database replication lag metric; wherein the local slave database replication lag metric is a first local slave database replication lag metric; wherein the pause interval is a first pause interval; and wherein the instructions are further configured for:
based at least in part on a determining that both: (a) a second geographic slave database replication lag metric is above the geographic slave database replication lag threshold and (b) a second local slave database replication lag metric is below the local slave database replication lag threshold, increasing the first pause interval to a second pause interval; and
serially submitting a third plurality of commands to the database server to delete data from the database;
wherein the serially submitting the third plurality of commands is based on sleeping for the second pause interval after a submission of a command of the third plurality of commands.

3. The system of claim 1, wherein the geographic slave database replication lag metric is a first geographic slave database replication lag metric; wherein the local slave database replication lag metric is a first local slave database replication lag metric; wherein the pause interval is a first pause interval; and wherein the instructions are further configured for:
based at least in part on determining that both: (a) a second geographic slave database replication lag metric is below the geographic slave database replication lag threshold and (b) a second local slave database replication lag metric is below the local slave database replication lag threshold, serially submitting a third plurality of commands to the database server to delete data from the database without sleeping for a pause interval after each submission of a command of the third plurality of commands.

4. The system of claim 1, wherein each command of the first plurality of commands and each command of the second plurality of commands is a Structured Query Language (SQL) delete command.

5. The system of claim 1, wherein the pause interval is a first pause interval; and wherein the instructions are further configured for sleeping for a second pause interval that is less than the first pause interval after each submission of a command of the first plurality of commands.

6. The system of claim 5, wherein the instructions are further configured for increasing the second pause interval to the first pause interval based, at least in part, on the determining that both: (a) the geographic slave database replication lag metric is above the geographic slave database replication lag threshold and (b) the local slave database replication lag metric is above the local slave database replication lag threshold.

7. The system of claim 1, wherein the instructions are further configured for selecting the pause interval as the maximum of the geographic slave database replication lag metric and the local slave database replication lag metric.

8. The system of claim 1, wherein the serially submitting the first plurality of commands to the database server to delete data from the database is based, at least in part, on not sleeping for a pause interval after each submission of a command of the first plurality of commands.

9. A method for causing replication lag-constrained deletion of data in a distributed data storage system, the method performed by a computing system comprising one or more processors and a memory, the method comprising:
serially submitting a first plurality of commands to a database server to cause the database server to delete data from a database,
wherein the serially submitting the first plurality of commands is based on pausing for a first pause interval after a submission of a command of the first plurality of commands;
determining a local slave database replication lag metric, wherein determining the local slave database replication lag metric is based on a data value that reflects a measured time of a replication process to replicate database data from the database to a third database that is local to the database;
based at least in part on determining that the local slave database replication lag metric is above a local slave database replication lag threshold, adjusting the first pause interval to a second pause interval;

by serially submitting a second plurality of commands to the database server, causing the database server to delete data from the database at a delete rate that is different than a delete rate at which data is deleted from the database by the serially submitting the first plurality of commands, wherein the serially submitting the second plurality of commands is based on pausing for the second pause interval after a submission of a command of the second plurality of commands.

10. The method of claim 9, wherein the adjusting the first pause interval is based, at least in part, on both: (a) the determining the local slave database replication lag metric is above the local slave database replication lag threshold, and (b) determining that a geographic slave database replication lag metric is above the geographic slave database replication lag threshold.

11. The method of claim 9, wherein the local slave database replication lag metric is a first local slave database replication lag metric; and wherein further comprising:

determining a geographic slave database replication lag metric, wherein determining the geographic slave database replication lag metric is based on a data value that reflects a measured time of a replication process to replicate database data from the first database to a second database that is in a different location than the first database;

based, at least in part on, determining that both: (a) a second local slave database replication lag metric is below the local slave database replication lag threshold and (b) a geographic slave database replication lag threshold is below the geographic slave database replication lag threshold, decreasing the second pause interval to a third pause interval; and serially submitting a third plurality of commands to the database server to delete data from the database including pausing for the third pause interval after each submission of a command of the third plurality of commands.

12. The method of claim 9, further comprising:

writing a database record associated with a first timestamp to a first database;

after the database record is replicated to a second database, reading the database record including the first timestamp from the second database;

based at least in part on the first timestamp of the database record read from the second database, determining the local slave database replication lag metric.

13. The method of claim 9, wherein the local slave replication lag metric measures replication lag between two databases located in a same data center.

14. The method of claim 9, wherein each command of the first plurality of commands is a Structured Query Language (SQL) delete command.

15. The method of claim 9, wherein each command of the first plurality of commands is executed against the database in context of a different database transaction.

16. One or more non-transitory computer-readable media storing one or more programs for causing replication lag-constrained deletion of data in a distributed data storage system, the one or more programs for execution by a computing system comprising one or more processors and a memory, the one or more programs comprising instructions to cause the computing system to perform operations comprising:

serially submitting a first plurality of commands to a database server to delete data from a database, wherein serially submitting the first plurality of commands is based on pausing for a first pause interval after a submission of a command of the plurality of commands;

determining a geographic slave database replication lag metric, wherein determining the geographic slave database replication lag metric is based on a data value that reflects a measured time of a replication process to replicate database data from the first database to a second database that is in a different location than the first database;

determining a local slave database replication lag metric, wherein determining the local slave database replication lag metric is based on a data value that reflects a measured time of a replication process to replicate database data from the first database to a third database that is in a same location as the first database;

based at least in part on determining that both: (a) the local slave database replication lag metric is below a local slave database replication lag threshold and (b) the geographic slave database replication lag metric is below a geographic slave database replication lag threshold, serially submitting a second plurality of commands to the database server to delete data from the database without pausing for the first pause interval after a submission of a command of the second plurality of commands.

17. The one or more non-transitory computer-readable media of claim 16, wherein the geographic slave database replication lag metric is a first geographic slave database replication lag metric; and wherein the instructions are further configured for:

based at least in part on determining that a second geographic slave database replication lag metric is above the geographic slave database replication lag threshold, serially submitting a third plurality of commands to the database server to delete data from the database including pausing for a pause interval after a submission of a command of the third plurality of commands.

18. The one or more non-transitory computer-readable media of claim 16, wherein the local slave database replication lag metric is a first local slave database replication lag metric; and wherein the instructions are further configured for:

based at least in part on determining that a second local slave database replication lag metric is above the local slave database replication lag threshold, serially submitting a third plurality of commands to the database server to delete data from the database including pausing for a pause interval after each submission of a command of the third plurality of commands.

19. The one or more non-transitory computer-readable media of claim 16, wherein the geographic replication lag metric measures replication lag between two databases located in different data centers.

20. The one or more non-transitory computer-readable media of claim 16, wherein a command of the first plurality of commands specifies a maximum number of database data objects to delete by the command.

21. The system of claim 1, wherein the first database and the second database are located in different data centers.

22. The system of claim 1, wherein the first database and the third database are co-located in a same data center.

\* \* \* \* \*